(12) United States Patent
Renes et al.

(10) Patent No.: US 12,537,693 B2
(45) Date of Patent: Jan. 27, 2026

(54) LOW-MEMORY DILITHIUM WITH MASKED HINT VECTOR COMPUTATION

(71) Applicant: NXP B.V., Eindhoven (NL)

(72) Inventors: Joost Roland Renes, 's-Hertogenbosch (NL); Tobias Schneider, Graz (AT); Melissa Azouaoui, Norderstedt (DE); Mohamed ElGhamrawy, Hamburg (DE)

(73) Assignee: NXP B.V., Eindhoven (NL)

( * ) Notice: Subject to any disclaimer, the term of this patent is extended or adjusted under 35 U.S.C. 154(b) by 245 days.

(21) Appl. No.: 18/366,384

(22) Filed: Aug. 7, 2023

(65) Prior Publication Data

US 2025/0097048 A1    Mar. 20, 2025

(51) Int. Cl.
*H04L 9/08* (2006.01)
*H04L 9/32* (2006.01)

(52) U.S. Cl.
CPC .......... *H04L 9/3247* (2013.01); *H04L 9/0852* (2013.01); *H04L 9/0869* (2013.01)

(58) Field of Classification Search
CPC ... H04L 9/3247; H04L 9/0852; H04L 9/0869; H04L 9/3252
See application file for complete search history.

(56) References Cited

U.S. PATENT DOCUMENTS

| | | | |
|---|---|---|---|
| 11,336,462 B1 * | 5/2022 | Maganti | ................ H04L 9/0852 |
| 11,416,638 B2 | 8/2022 | Banerjee | |
| 11,496,297 B1 | 11/2022 | Beckwith | |
| 2022/0012334 A1 | 1/2022 | Ghosh | |
| 2024/0031127 A1 * | 1/2024 | Basso | ..................... H04L 9/002 |

(Continued)

FOREIGN PATENT DOCUMENTS

| | | | | |
|---|---|---|---|---|
| CN | 112910649 A | | 6/2021 | |
| EP | 4422126 A1 * | | 8/2024 | ........... H04L 9/3093 |
| KR | 102462395 B1 | | 11/2022 | |

OTHER PUBLICATIONS

Sailada et al. (NPL: Crystal Dilithium Algorithm for Post Quantum Cryptography: Experimentation and Use case for eSign, IEEE, 2022. (Year: 2022).*

(Continued)

*Primary Examiner* — Lynn D Feild
*Assistant Examiner* — Abdullah Almamun

(57) ABSTRACT

A method of performing a Dilithium signature operation on a message M using a secret key sk, including: calculating a value $\tilde{r}$ based upon $w_0$, c, and $s_2$, where $w_0$ and c are calculated as part of the Dilithium signature operation and $s_2$ is part of the secret key sk; performing a bound check on $\tilde{r}$ based upon $\gamma_2$ and $\beta$, where $\gamma_2$ and $\beta$ are parameters of the Dilithium signature operation; calculating a hint h based on the value $\tilde{r}$ and deleting the value $\tilde{r}$ in a memory; regenerating a value y using an ExpandMask function; calculating z based upon y, c, and $s_1$, where $s_1$ is part of the secret key sk and replacing y with z in the memory; performing a bound check on z based on $\gamma_1$ and $\beta$, where $\gamma_1$ is a parameter of the Dilithium signature operation; and returning a digital signature of the message M where the digital signature includes z and h.

22 Claims, 3 Drawing Sheets

```
           5:   while (z,h) = ⊥ do
    y      6:      y = ExpandMask(ρ',κ)
    w      7:      w = Ay
w₁  w₀     8:      (w₀,w₁) = Decompose(w,2γ₂)
           9:      c̃ = H(μ||w₁)
          10:      c = SampleInBall(c̃)
    r̃     11:      r̃ = w₀ - cs₂
          12:      if ||r̃||∞ ≥ γ₂ - β then (z,h) = ⊥
          13:      else
    h     14:         h = MakeHint(r̃,c,t₀,w₁,γ₂)
          15:         if ||ct₀||∞ ≥ γ₂ then (z,h) = ⊥
          16:         else
    y     17:            y = ExpandMask(ρ',κ)
    z     18:            z = y + cs₁
          19:            if ||z||∞ ≥ γ₁ - β then (z,h) = ⊥
          20:            else if # of 1's in h is greater than ω then (z,h) = ⊥
          21:      κ = κ + l
          22:   return σ = (c̃,z,h)
```

(56) References Cited

U.S. PATENT DOCUMENTS

| | | | |
|---|---|---|---|
| 2024/0048393 A1* | 2/2024 | Beckwith | H04L 9/3093 |
| 2024/0249003 A1* | 7/2024 | Pessl | G06F 21/602 |
| 2025/0047465 A1* | 2/2025 | Schnoor | H04L 9/3247 |

OTHER PUBLICATIONS

Aikata, Ahmet Can Mert, Malik Imran, Samuel Pagliarini, and Sujoy Sinha Roy, Kali: A crystal for post-quantum security using kyber and dilithium, IEEE Trans. Circuits Syst. I Regul. Pap. 70 (2023), No. 2, 747-758.

Aikata Aikata, Ahmet Can Mert, David Jacquemin, Amitabh Das, Donald Matthews, Santosh Ghosh, and Sujoy Sinha Roy, A unified cryptoprocessor for lattice-based signature and key-exchange, IACR Cryptol. ePrint Arch. (2021), 1461.

Luke Beckwith, Abubakr Abdulgadir, and Reza Azarderakhsh, A flexible shared hardware accelerator for nist-recommended algorithms crystals-kyber and crystals-dilithium with sea protection, NIST Fourth PQC Standardization Conference (2022).

Joppe W. Bos, Joost Renes, and Amber Sprenkels, Dilithium for memory constrained devices, IACR Cryptol. ePrint Arch. (2022), 323.

Olivier Bronchain and Gaetan Cassiers, Bitslicing arithmetic/boolean masking conversions for fun and profit with application to lattice-based kems, IACR Trans. Cryptogr. Hardw. Embed. Syst. 2022 (2022), No. 4, 553-588.

Leo Ducas, Eike Kiltz, Tancrede Lepoint, Vadim Lyubashevsky, Peter Schwabe, Gregor Seiler, and Damien Stehle, Crystals-dilithium algorithm specifications and supporting documentation (version 3.1), 2021.

Denisa O. C. Greconici, Matthias J. Kannwischer, and Amber Sprenkels, Compact dilithium implementations on cortex-m3 and cortex-m4, IACR Cryptol. ePrint Arch. (2020), 1278.

Yuval Ishai, Amit Sahai, and David A. Wagner, Private circuits: Securing hardware against probing attacks, CRYPTO, Lecture Notes in Computer Science, vol. 2729, Springer, 2003, pp. 463-481.

Matthias J. Kannwischer, Joost Rijneveld, Peter Schwabe, and Ko Stoffelen, pqm4: Testing and benchmarking NIST PQC on ARM cortex-m4, IACR Cryptol. ePrint Arch. (2019), 844.

Georg Land, Pascal Sasdrich, and Tim Güneysu, A hard crystal—implementing dilithium on reconfigurable hardware, IACR Cryptol. ePrint Arch. (2021), 355.

Vincent Migliore, Benoit Gerard, Mehdi Tibouchi, and Pierre-Alain Fouque, Masking dilithium: Efficient implementation and side-channel evaluation, IACR Cryptol. ePrint Arch. (2019), 394.

National Institute of Standards and Technology, Post-quantum cryptography standardization, https://csrc.nist.gov/Projects/Post-Quantum-Cryptography/Post-Quantum-Cryptography-Standardization.

Hauke Malte Steffen, Georg Land, Lucie Johanna Kogelheide, and Tim Güneysu, Breaking and protecting the crystal: Side-channel analysis of dilithium in hardware, IACR Cryptol. ePrint Arch. (2022), 1410.

Cankun Zhao, Neng Zhang, Hanning Wang, Bohan Yang, Wenping Zhu, Zhengdong Li, Min Zhu, Shouyi Yin, Shaojun Wei, and Leibo Liu, A compact and high-performance hardware architecture for crystals-dilithium, IACR Trans. Cryptogr. Hardw. Embed. Syst. 2022 (2022), No. 1, 270-295.

U.S. Appl. No. 17/935,550, filed Sep. 26, 2022.
U.S. Appl. No. 17/835,898, filed Jun. 8, 2022.
U.S. Appl. No. 18/320,028, filed May 18, 2023.

* cited by examiner

5:  while $(z,h) = \perp$ do
6:   $y = \text{ExpandMask}(\rho', \kappa)$
7:   $w = Ay$
8:   $(w_0, w_1) = \text{Decompose}(w, 2\gamma_2)$
9:   $\tilde{c} = H(\mu || w_1)$
10:  $c = \text{SampleInBall}(\tilde{c})$
11:  $\tilde{r} = w_0 - cs_2$
12:  if $||\tilde{r}||_\infty \geq \gamma_2 - \beta$ then $(z,h) = \perp$
13:  else
14:   $h = \text{MakeHint}(\tilde{r}, c, t_0, w_1, \gamma_2)$
15:   if $||ct_0||_\infty \geq \gamma_2$ then $(z,h) = \perp$
16:   else
17:    $y = \text{ExpandMask}(\rho', \kappa)$
18:    $z = y + cs_1$
19:    if $||z||_\infty \geq \gamma_1 - \beta$ then $(z,h) = \perp$
20:    else if # of 1's in h is greater than $\omega$ then $(z,h) = \perp$
21:  $\kappa = \kappa + \ell$
22: return $\sigma = (\tilde{c}, z, h)$

FIG. 2

LOW-MEMORY DILITHIUM WITH MASKED HINT VECTOR COMPUTATION

FIELD OF THE DISCLOSURE

Various exemplary embodiments disclosed herein relate to low-memory Dilithium with masked hint vector computation.

BACKGROUND

Recent significant advances in quantum computing have accelerated the research into post-quantum cryptography schemes: cryptographic algorithms which run on classical computers but are believed to be still secure even when faced against an adversary with access to a quantum computer. This demand is driven by interest from standardization bodies such as the call for proposals for new public-key cryptography standards by the National Institute of Standards and Technology (NIST). The first selection procedure for this new cryptographic standard has ended and the lattice-based digital signature scheme Dilithium has been selected by the NIST as one of the future standards for post-quantum cryptography.

SUMMARY

A summary of various exemplary embodiments is presented below.

Various embodiments relate to a method of performing a Dilithium signature operation on a message M using a secret key sk, including: calculating a value $\tilde{r}$ based upon $w_0$, c, and $s_2$, where $w_0$ and c are calculated as part of the Dilithium signature operation and $s_2$ is part of the secret key sk; performing a bound check on $\tilde{r}$ based upon $\gamma_2$ and $\beta$, where $\gamma_2$ and $\beta$ are parameters of the Dilithium signature operation; calculating a hint h based on the value $\tilde{r}$ and deleting the value $\tilde{r}$ in a memory; regenerating a value y using an ExpandMask function; calculating z based upon y, c, and $s_1$, where $s_1$ is part of the secret key sk and replacing y with z in the memory; performing a bound check on z based on $\gamma_1$ and $\beta$, where $\gamma_1$ is a parameter of the Dilithium signature operation; and returning a digital signature of the message M where the digital signature includes z and h.

Various embodiments are described, wherein calculating the value $\tilde{r}$ in includes calculating:

$$\tilde{r} = w_0 - cs_2.$$

Various embodiments are described, wherein performing a bound check on $\tilde{r}$ includes determining if $\|\tilde{r}\|_\infty \geq \gamma_2 - \beta$.

Various embodiments are described, wherein calculating the hint h based is further based on c, $t_0$, $w_1$, and $\gamma_2$, where to is part of the secret key sk, where $w_1$ is calculated as part of the Dilithium signature operation, and where $\gamma_2$ is a parameter of the Dilithium signature operation.

Various embodiments are described, further including after calculating the hint h determining if $\|ct_0\|_\infty \geq \gamma_2$.

Various embodiments are described, wherein regenerating the value y is based upon $\rho'$ and $\kappa$, where $\kappa$ is a counter value and $\rho!$ is a randomly generated value.

Various embodiments are described, wherein regenerating the value y is based upon $\rho'$ and $\kappa$, where $\kappa$ is a counter value and $\rho'$ is based on the message M.

Various embodiments are described, wherein calculating z includes calculating $z=y+cs_1$.

Various embodiments are described, wherein performing a bound check on z includes determining if $\|z\|_\infty \geq \gamma_1 - \beta$.

Various embodiments are described, further including determining if a number of 1's in h is greater than $\omega$, where $\omega$ is is a parameter of the Dilithium signing algorithm.

Various embodiments are described, wherein $\tilde{r}$, z, and y are masked using a plurality of shares.

Further various embodiments relate to a data processing system including instructions embodied in a non-transitory computer readable medium, the instructions for a method of performing a Dilithium signature operation on a message M using a secret key sk, the instructions, including: calculating a value $\tilde{r}$ based upon $w_0$, c, and $s_2$, where $w_0$ and c are calculated as part of the Dilithium signature operation and $s_2$ is part of the secret key sk; performing a bound check on $\tilde{r}$ based upon $\gamma_2$ and $\beta$ where $\gamma_2$ and $\beta$ are parameters of the Dilithium signature operation; calculating a hint h based on the value $\tilde{r}$ and deleting the value $\tilde{r}$ in a memory; regenerating a value y using an ExpandMask function; calculating z based upon y, c, and $s_1$, where $s_1$ is part of the secret key sk and replacing y with z in the memory; performing a bound check on z based on $\gamma_1$ and $\beta$, where $\gamma_1$ is a parameter of the Dilithium signature operation; and returning a digital signature of the message M where the digital signature includes z and h.

Various embodiments are described, wherein calculating the value $\tilde{r}$ in includes calculating:

$$\tilde{r} = w_0 - cs_2.$$

Various embodiments are described, wherein performing a bound check on $\tilde{r}$ includes determining if $\|\tilde{r}\|_\infty \geq \gamma_2 - \beta$.

Various embodiments are described, wherein calculating the hint h based is further based on c, $t_0$, $w_1$, and $\gamma_2$, where to is part of the secret key sk, where $w_1$ is calculated as part of the Dilithium signature operation, and where $\gamma_2$ is a parameter of the Dilithium signature operation.

Various embodiments are described, further including after calculating the hint h determining if $\|ct_0\|_\infty \geq \gamma_2$.

Various embodiments are described, wherein regenerating the value y is based upon $\rho'$ and $\kappa$, where $\kappa$ is a counter value and $\rho\rho'$ is a randomly generated value.

Various embodiments are described, wherein regenerating the value y is based upon $\rho'$ and $\kappa$, where $\kappa$ is a counter value and $\rho'$ is based on the message M.

Various embodiments are described, wherein calculating z includes calculating $z=y+cs_1$.

Various embodiments are described, wherein performing a bound check on z includes determining if $\|z\|_\infty \geq \gamma_1 - \beta$.

Various embodiments are described, further including determining if a number of 1's in h is greater than $\omega$, where $\omega$ is is a parameter of the Dilithium signing operation.

Various embodiments are described, wherein $\tilde{r}$, z, and y are masked using a plurality of shares.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 2 illustrates the memory lifespan of different variables during a Dilithium signature generation following using the low memory Dilithium signature algorithm as described in a high level in Algorithm 4.

DETAILED DESCRIPTION

Figure 1:
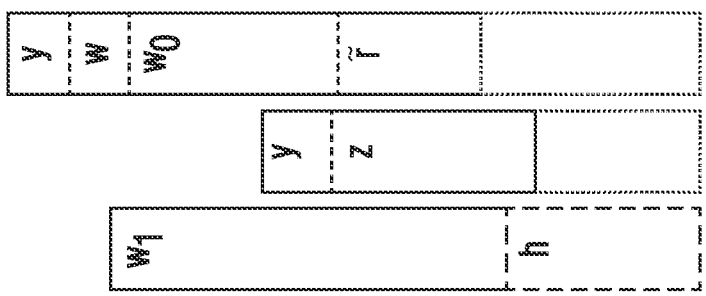
FIG. 1 illustrates the memory lifetime of different variables during a standard Dilithium signature generation during Algorithm 2.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of post-quantum cryptography digital signature systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Recent significant advances in quantum computing have accelerated the research into post-quantum cryptography schemes: cryptographic algorithms which run on classical computers but are believed to be still secure even when faced with an adversary with access to a quantum computer. This demand is driven by interest from standardization bodies such as the call for proposals for new public-key cryptography standards by the National Institute of Standards and Technology (NIST). The first selection procedure for this new cryptographic standard has ended and the lattice-based digital signature scheme Dilithium has been selected by the NIST as one of the future standards for post-quantum cryptography.

This disclosure presents a method to compute a Dilithium signature which reduces its runtime memory footprint, enabling more efficient and secure masked implementations of its signature generation. The main idea is based on a strategic reordering of the operations and the computations of specific large vectors of polynomials. These large vectors also require masking to protect Dilithium implementations against side-channel attacks. This causes increased memory overhead. The methods and systems disclosed in this disclosure improve the memory scheduling such that the memory lifespans of these large masked vectors are not overlapping, allowing significant saving in the amount of memory needed for the digital signature that may then be repurposed to improve latency or security. To achieve this, a new required masked hint computation algorithm for Dilithium is proposed.

First the relevant algorithms for Dilithium and the corresponding parameter sets are disclosed. Notably, there are two versions of the signing algorithm: a deterministic version and a randomized version.

Table 1 below provides the values of the Dilithium parameters for different NIST security levels.

TABLE 1

| NIST Security level | 2 | 3 | 5 |
|---|---|---|---|
| q (modulus) | $2^{23} - 2^{13} + 1$ | $2^{23} - 2^{13} + 1$ | $2^{23} - 2^{13} + 1$ |
| d (number of dropped bits from t) | 13 | 13 | 13 |
| τ (# of ± 1's in c) | 39 | 49 | 60 |
| $\gamma_1$ (y coefficient range) | $2^{17}$ | $2^{19}$ | $2^{19}$ |
| $\gamma_2$ (low order rounding range) | (q-1)/88 | (q-1)/32 | (q-1)/32 |
| (k, l) (dimensions of A) | (4, 4) | (6, 5) | (8, 7) |
| η (secret key range) | 2 | 4 | 2 |
| β (= τ · η) | 78 | 196 | 120 |
| ω (max. # 1's in h) | 80 | 55 | 75 |
| average number of signing iterations | 4.25 | 5.1 | 3.85 |

Algorithm 2 below provides a description of the key generation procedure in Dilithium. In the current Dilithium specification (version 3.1), the secret key K is only used for deterministic signing. The future Dilithium standard edited by the NIST might include K in randomized signing as well.

ALGORITHM 1

| KeyGen |
|---|
| 1: $\zeta \leftarrow \{0,1\}^{256}$ ▷ cryptographic random seed |
| 2: $(\rho, \zeta, K) = H(\zeta)$ ▷ $(\rho, \zeta, K) \in \{0,1\}^{256} \times \{0,1\}^{512} \times \{0,1\}^{256}$ |
| 3: $A = \text{ExpandA}(\rho)$ ▷ $A \in R^{k \times l}$ |
| 4: $(s_1, s_2) = \text{ExpandS}(\zeta)$ ▷ $(s_1, s_2) \in S^l_\eta \times S^k_\eta$ |
| 5: $t = As_1 + s_2$ |
| 6: $(t_1, t_0) =$ |

ALGORITHM 1-continued

| KeyGen | |
|---|---|
| Power2Round(t, d) | |
| 7: tr = H(ρ‖$t_1$) | ▷ tr ∈ $\{0,1\}^{256}$ |
| 8: pk = (ρ, $t_1$), sk = (ρ, K, tr, $s_1$, $s_2$, $t_0$) | |

Algorithm 2 below provides a description of the signature generation procedure in Dilithium. The main difference between deterministic and randomized signatures lies in Algorithm 2, line 4. The secret seed ρ' used to generate the secret masking vector y is either derived from the secret key K and the hash μ of the message or generated from a TRNG. The final NIST standard might use K to derive y in both deterministic and randomized versions, however this does not affect the method described in this disclosure. The Dilithium specification document describes two versions of implementing Dilithium: the first less efficient one using r and the second more efficient using $\tilde{r}$.

| Algorithm 2 - Sign(sk, M) | |
|---|---|
| 1: A = ExpandA(ρ) | |
| 2: μ = H (tr‖M) | ▷ μ ∈ $\{0, 1\}^{512}$ |
| 3: κ = 0, (z, h) = ⊥ | |
| 4: ρ' = H(K‖μ) $\left(\text{or } \rho' \xleftarrow{\$} \{0, 1\}^{512} \text{ for randomized signing}\right)$ | ▷ ρ' ∈ $\{0, 1\}^{512}$ |
| 5: while (z, h) = ⊥ do | |
| 6:   y = ExpandMask(ρ', κ) | ▷ y ∈ $\tilde{S}_{\gamma_1}^l$ |
| 7:   w = Ay | |
| 8:   ($w_0$, $w_1$) = Decompose(w, 2$\gamma_2$) | |
| 9:   $\tilde{c}$ = H (μ‖$w_1$) | ▷ $\tilde{c}$ ∈ $\{0, 1\}^{256}$ |
| 10:  c = SampleInBall($\tilde{c}$) | ▷ c ∈ $B_\tau$ |
| 11:  z = y + c$s_1$ | |
| 12:  $\tilde{r}$ = $w_0$ − c$s_2$ | |
| 13:  if ‖z‖$_\infty$ ≥ $\gamma_1$ − β or ‖$\tilde{r}$‖$_\infty$ ≥ $\gamma_2$ − β then (z, h) = ⊥ | |
| 14:  else | |
| 15:    h = MakeHint($\tilde{r}$, c, $t_0$, $w_1$, $\gamma_2$) | |
| 16:    if ‖c$t_0$‖$_\infty$ ≥ $\gamma_2$ or the # of 1's in h is greater than ω then (z, h) = ⊥ | |
| 17:  κ = κ + 1 | |
| 18: return σ = ($\tilde{c}$, z, h) | |

Algorithm 3 provides a description of the signature verification procedure in Dilithium.

ALGORITHM 3

| Verify(pk,M, σ = ($\tilde{c}$, z, h)) |
|---|
| 1: A = ExpandA(ρ) |
| 2: μ = H (H(ρ‖$t_1$)‖M) |
| 3: c = SampleInBall($\tilde{c}$) |
| 4: $w_1'$ = UseHint(h, Az − c$t_1$ · $2^d$, 2$\gamma_2$) |
| 5: return ⟦‖Z‖$_\infty$ < $\gamma_1$ − β⟧ ∧ ⟦$\tilde{c}$ = H(μ‖$w_1'$)⟧ ∧ ⟦# of 1's in h is at most ω⟧ |

As is the case with all cryptographic schemes, embedded implementations of Dilithium can be targeted by Side-Channel Attacks (SCA). SCA exploits data dependencies in physical measurements of the target device (e.g., power consumption) to recover secret keys and may be thwarted by masking the processed data. However, masking increases the memory footprint of implementations because any sensitive data is split up into multiple shares. This is in particular very challenging for Dilithium's signature generation algorithm due to its high memory requirements. Indeed, the reference and optimized implementations of Dilithium in the benchmarking framework pqm4 (using a Cortex-M4 microcontroller) require 50 to 100 KiB of memory. This is not only attributed to the relatively large key and signature size, but also the heavy use of stack space for the storage of intermediate data during Dilithium's signature generation.

It is noted that executing a masked implementation of Dilithium on memory constrained devices (with 4 to 32 KiB of SRAM) while maintaining reasonable latency is quite a challenge. Dilithium follows the Fiat-Shamir with aborts framework, which means that some intermediate variables, namely z which is returned as part of the signature and $\tilde{r}$ in Algorithm 2 are considered sensitive (and hence need to remain masked) until both norm checks at line 13 in Algorithm 2 have passed. As a result, when masking with only 2 shares, more than 11 KiB, 16 KiB and 22 KiB are needed for z and $\tilde{r}$ only (ignoring other variables), for Dilithium level II, III and V, respectively. For most embedded systems this is not feasible and leads to the need for efficient implementation strategies that reduce the runtime memory.

In this disclosure new algorithms to compute a masked Dilithium signature are presented that reduce the memory footprint, enabling more efficient and secure masked implementations of its signature generation. The main idea is based on the following observations and conclusions.

Because the order of evaluation of z and $\tilde{r}$ does not matter, either of the values may be chosen to be computed first. Although the order does not matter, it should be noted that z is part of the signature and is thus required in full. On the contrary, $\tilde{r}$ is not output at all. As such, the algorithm chooses to compute $\tilde{r}$ and evaluate its norm check first after which only the information that is required for the signature (i.e., the hint vector) is stored in masked form. After successfully completing the norm check on z, everything is unmasked before releasing the signature. This way z and $\tilde{r}$ are never stored in full at the same time.

Due to the Fiat-Shamir with aborts framework that Dilithium is based on, z and $\tilde{r}$ have to remain masked until the final check. Because it is suggested that $\tilde{r}$ be computed first, it is also needed to compute the hints before z, from a still potentially sensitive $\tilde{r}$ (because the norm of z has not been checked yet). This is not the case for existing implementations, where the hint vector is always assumed to be public. Accordingly, a masked algorithm for MakeHint is provided.

Based on the above described features, a high level overview of a low memory signing algorithm is given in Algorithm 4 that illustrates the proposed new Dilithium signing process.

When masking with Boolean shares, sensitive values are split up into Boolean shares. A Boolean masked variable x is denoted as $x^{(\cdot)B}$, with $\oplus_{i=0}^{n_s-1} x^{(i)B} = x$, $n_s$ being the numberr of shares. Below, the rest of the notations and functions

---

Algorithm 4 - Sign_Low_Mem(sk, M)

---

1: $A = \text{ExpandA}(\rho)$
2: $\mu = H(tr||M)$                 ▷ $\mu \in \{0, 1\}^{512}$
3: $\kappa = 0, (z, h) = \perp$ 4: $\rho' = H(K||\mu)$ $\left(\text{or } \rho' \xleftarrow{\$} \{0, 1\}^{512} \text{ for randomized signing}\right)$    ▷ $\rho' \in \{0, 1\}^{512}$ 5: while $(z, h) = \perp$ do
6:    $y = \text{ExpandMask}(\rho', \kappa)$                     ▷ $y \in \tilde{S}_{\gamma_1}^l$
7:    $w = Ay$
8:    $(w_0, w_1) = \text{Decompose}(w, 2\gamma_2)$
9:    $\tilde{c} = H(\mu||w_1)$                             ▷ $\tilde{c} \in \{0, 1\}^{256}$
10:    $c = \text{SampleInBall}(\tilde{c})$                    ▷ $c \in B_\tau$
11:    $\tilde{r} = w_0 - cs_2$
12:    if $\|\tilde{r}\|_\infty \geq \gamma_2 - \beta$ then $(z, h) = \perp$
13:    else
14:      $h = \text{MakeHint}(\tilde{r}, c, t_0, w_1, \gamma_2)$     ▷ compute masked hint and delete $\tilde{r}$
15:      if $\|ct_0\|_\infty \geq \gamma_2$ then $(z, h) = \perp$
16:      else
17:        $y = \text{ExpandMask}(\rho', \kappa)$               ▷ regenerate y
18:        $z = y + cs_1$                  ▷ replace y in memory with z
19:        if $\|z\|_\infty \geq \gamma_1 - \beta$ then $(z, h) = \perp$    ▷ unmask z and h if check passes
20:        else if # of 1's in h is greater than $\omega$ then $(z, h) = \perp$
21:    $\kappa = \kappa + 1$
22: return $\sigma = (\tilde{c}, z, h)$

---

First, regarding the norm checks, because $\tilde{r}$ is not needed for the final signature, it is computed first before z, and $w_0$ can then be cleared by overwriting it with $\tilde{r}$. If $\tilde{r}$ passes the norm check then the next step is to generate the hint vector from a masked $\tilde{r}$ and $w_1$ (see Algorithm 4, line 14). Once this is done both $\tilde{r}$ and $w_1$ may be cleared leaving room for z. In addition, after line 9 which uses $w_1$ as input to a hash, $w_1$ may be compressed to a single bit per coefficient because the only remaining information needed on $w_1$ to compute the hints is of the form $w_1 \neq 0$.

Second, regarding the masking of variables, the need to mask both $\tilde{r}$ and z is dictated by the security proof of Dilithium. Before both the norm checks have passed, $\tilde{r}$ and z can reveal information on the secret key. Even if z passes the check, it cannot be unmasked because it can be used to compute an unchecked $\tilde{r}$ which can then reveal information on the secret key, and vice versa. In the low memory signing algorithm, because the hints are computed and $\tilde{r}$ is cleared before z is computed, an algorithm is additionally described to perform the hint computation in a masked fashion to not leak $\tilde{r}$. Further at line 17, y is regenerated, and then when z is calculated at line 18, it replaces y in memory. In addition, the Hamming weight check is only performed on h (Algorithm 4, line 20) after all other checks have passed to unmask h and perform the Hamming weight check unmasked and hence efficiently. In the following sections, a masked $w_1$ is considered, however the low memory signing algorithm is also compatible with no masking of $w_1$, as it may not be necessary for some use cases.

The next sections are dedicated to explaining the details of this high level overview of the low memory signing algorithm. A description of the MaskedMakeHint algorithm (that is a masked version of MakeHint) is first provided and then the improvements that the low memory singing algorithm leads to are discussed.

The low memory signing algorithm includes a masked hint computation which is provided in Algorithm 5. First the notations and definitions of the operations/gadgets used in Algorithm 5 are defined.

used in Algorithm 5 are provided. Note that the low memory signing algorithm is independent of the concrete instantiation of these gadgets, as long as the required security properties are fulfilled.

SecAdd provides a secure addition of Boolean shares. There are multiple known approaches in literature that may be used to implement this function.

SecBoundCheck provides a secure bound check from U.S. patent application Ser. No. 18/320,028 filed on May 18, 2023, title "MASKED INFINITY NORM CHECK FOR CRYSTALS-DILITHIUM SIGNATURE GENERATION" (the '028 application) which is hereby incorporated by reference for all purposes as if fully set forth herein. Given an element $x \in Z_q$ and a bound b it returns 1 if $\|x\| \leq b$ and 0 otherwise. Other versions of SecBoundCheck may be used as well.

SecAND provides a secure AND on Boolean shares. There are multiple known approaches in literature that may be used to implement this function.

BitCollapseAND collapses all input bits to one output bit using SecAND. It ANDs all the bits of the individual input shares resulting in a sharing of a single bit.

SecXOR provides a secure XOR on Boolean shares. One straightforward approach is to XOR each of the input shares separately.

NOT provides a logical not operator. On masked inputs, the NOT operation is only applied to one of the input shares.

---

ALGORITHM 5

MaskedMakeHint

---

1: $a^{(\cdot)B} = \text{SecAdd}(\tilde{r}^{(\cdot)B}, ct_0)$
2: $b^{(\cdot)B} = \text{NOT}(\text{SecBoundCheck}(a^{(\cdot)B}, \gamma_2))$    ▷ 1 if $|a| \geq \gamma_2$
3: $e^{(\cdot)B} = \text{BitCollapseAND}(\text{NOT}$    ▷ 1 if $a == q - \gamma_2$
     $(\text{SecXOR}(a^{(\cdot)B}, -\gamma_2)))$
4: $f^{(\cdot)B} = \text{NOT}(\text{BitCollapseAND}$    ▷ 1 if $w_1 \neq 0$
     $(\text{NOT}(w_1^{(\cdot)B})))$ ALGORITHM 5-continued MaskedMakeHint 5: $g^{(\cdot)B}$ = SecAND($e^{(\cdot)B}$, $f^{(\cdot)B}$)  ▷ 11 if (a == −$\gamma_2$
6: return SecXOR($b^{(\cdot)B}$, $g^{(\cdot)B}$)  AND w1 ≠ 0)

The MakeHint function computes the following conditions $$(a > \gamma_2 \text{ OR } a < -\gamma_2 \text{ OR } (a == -\gamma_2 \text{ AND } w_1 \neq 0)) \quad (1)$$

where a is a coefficient of $\tilde{r}+ct_0$ and $w_1$ is a coefficient of $w_1$. MakeHint returns 1 if the conditions are verified and 0 otherwise. This check is done for all coefficients of the input vectors to compute all the elements/bits of the hint vector h. To this end, in Algorithm 5, first $a^{(\cdot)B}$ is computed using Boolean addition as $\tilde{r}^{(\cdot)B}$ is Boolean masked (otherwise it can be converted using an Arithmetic to Boolean masking conversion). Then the two first conditions on a are checked using the SecBoundCheck gadget from the '028 application (or any other masked bound check that achieves the same result). Line 3 computes the first equality condition and sets e to 1 if a==−$\gamma_2$. In addition, line 4 computes the second equality condition and sets f to 1 if $w_1 \neq 0$. Then b and g, corresponding to the two exclusive conditions, are combined with a SecXOR.

In the following figures, a rectangle with solid lines will be used to illustrate the lifetime of sensitive variables, i.e., variables that have to remain secret and protected from side-channel leakage using masking. Rectangles with a short dashed line illustrate the lifetime of variables that are not deemed sensitive based on the current state-of-the-art on side-channel attacks on Dilithium. These rectangles also show variables that are unmasked at some point in the signing process. Rectangles with a long dashed line correspond to the lifetimes of variables that do not need to be masked and that are also already relatively small (e.g., the 1 bit per coefficient vector h in the standard Dilithium signing) or compressed to a smaller size (e.g., at some point in the low memory signing algorithm only 1 bit per coefficient of $w_1$ is needed). Rectangles with a medium dashed line illustrate small variables that require masking. Horizontal dashed lines in the rectangles are used to show that for some specific operations, inputs may be overwritten by the result hence saving memory (e.g., polynomial additions for which this is straightforward). For simplicity, variables are ignored that do not affect the low memory signing algorithm or its memory improvements.

FIG. 1 illustrates the memory lifetime of different variables during a standard Dilithium signature generation during Algorithm 2. Notice that the memory lifespans of z and $\tilde{r}$ overlap and also the memory lifespans of y and $w_0$, that means that for only 2 masking shares, over 11 KiB of memory are needed for only one pair of these variables. The memory requirements grow linearly versus the number of shares, which means that over 22 KiB are needed for one pair of these variables when masking with 4 shares.

FIG. 2 illustrates the memory lifespan of different variables during a Dilithium signature generation following using the low memory Dilithium signature algorithm as described in a high level in Algorithm 4. First, the main impact can be visually seen by the fact that the memory lifespans of all the intermediates y, w, $w_0$, $\tilde{r}$ and z, are almost contiguous but do not overlap (variables can be overwritten by others, e.g., $w_0$ by $\tilde{r}$). This means that for the example of a 2-share masked NIST level 2 Dilithium implementation, over 5 KiB of memory is saved. This memory can then be used to store other variables and avoid potentially costly operations or to mask with more shares and hence improve the side-channel security of the implementation.

Table 2 shows the memory savings brought by this invention over a standard Dilithium signing process for different NIST security levels and number of masking shares.

TABLE 2

| # of shares | 1 (no masking) | 2 | 3 | 4 |
|---|---|---|---|---|
| NIST level 2 | 3 KiB | 6 KiB | 9 KiB | 11 KiB |
| NIST level 3 | 4 KiB | 7 KiB | 11 KiB | 14 KiB |
| NIST level 5 | 5 KiB | 10 KiB | 15 KiB | 20 KiB |

Figure 3:
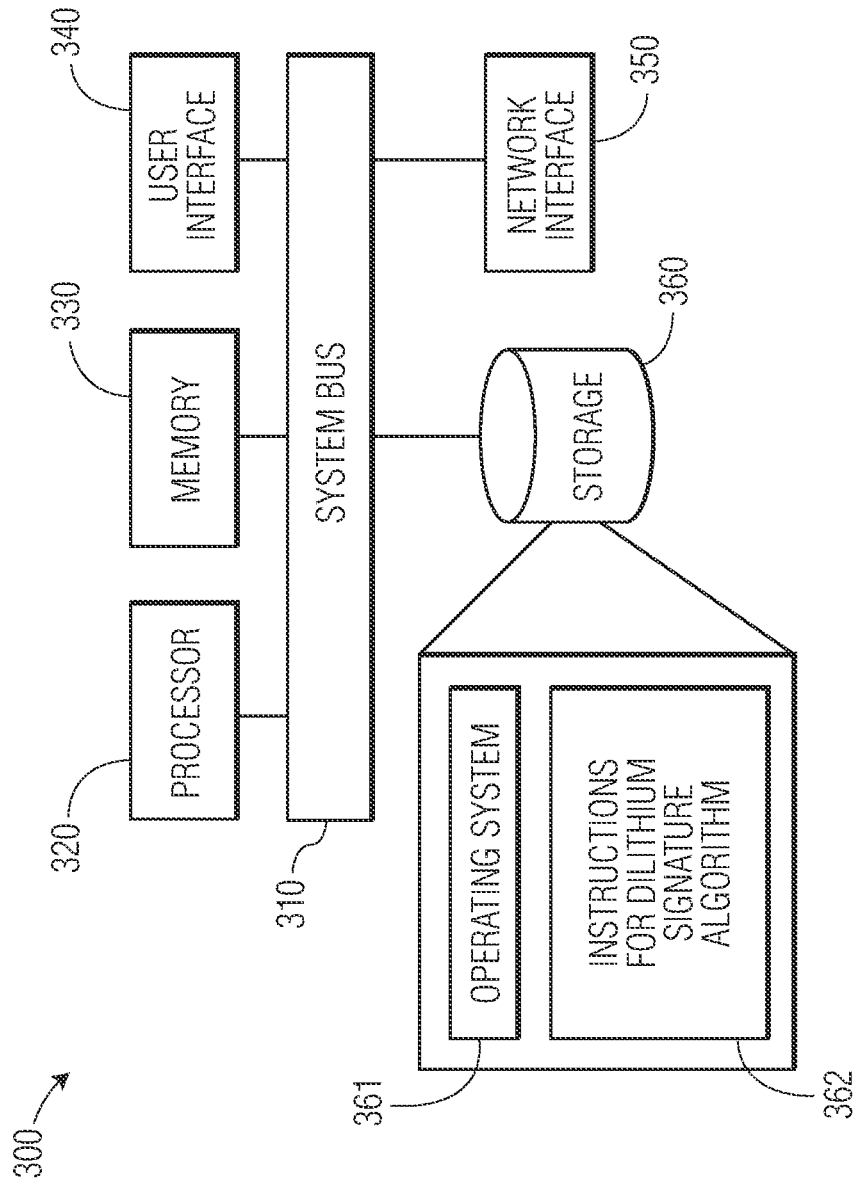
FIG. 3 illustrates an exemplary hardware diagram for implementing a memory saving Dilithium signature algorithm.

FIG. 3 illustrates an exemplary hardware diagram 300 for implementing a memory saving Dilithium signature algorithm. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 340 may include one or more devices for enabling communication with a user such as an administrator. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. Storage 362 may include instructions for carrying out the memory saving Dilithium signature algorithm.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

The system bus 310 allows communication between the processor 320, memory 330, user interface 340, storage 360, and network interface 350.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c. b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of performing a Dilithium signature operation on a message M using a secret key sk using a processor of a computing device that is executing computer-readable instructions that, when executed, cause the processor to perform the method comprising:

calculating a value $\tilde{r}$ based upon $w_0$, c, and $s_2$, where $w_0$ and c are calculated as part of the Dilithium signature operation and $s_2$ is part of the secret key $s_k$, wherein $w_0$ represents an intermediate value and c represents a challenge variable;

performing a bound check on the value $\tilde{r}$ based upon $\gamma_2$ and $\beta$, where $\gamma_2$ represents a low-order rounding range of a value y and $\beta$ represents a product of a number of ones in the challenge variable c and a private key range $\eta$, where $\gamma_2$ and $\beta$ are parameters of the Dilithium signature operation;

calculating a hint h based on the value f and deleting the value $\tilde{r}$ in a memory;

regenerating the value $\gamma$ using an ExpandMask function, the value y represents a secret masking vector;

calculating z based upon the value y, the challenge variable c, and $s_1$, where $s_1$ is part of the secret key sk, and where z is a vector;

replacing the value y with z in the memory;

performing a bound check on z based on $\gamma_1$ and $\beta$, where $\gamma_1$ is a coefficient range of the value y of the Dilithium signature operation; and returning a digital signature of the message M where the digital signature includes z and h.

2. The method of claim 1, wherein calculating the value f includes calculating:

$$\tilde{r} = w_0 - cs_2.$$

3. The method of claim 1, wherein performing a bound check on $\tilde{r}$ includes determining if $$\|\tilde{r}\|_\infty \geq \gamma_2 - \beta.$$

4. The method of claim 1, wherein calculating the hint h is further based on c, $t_0$, $w_1$, and $\gamma_2$, where to is part of the secret key sk, where $w_1$ is calculated as part of the Dilithium signature operation, and where $\gamma_2$ is a parameter of the Dilithium signature operation.

5. The method of claim 1, further comprising after calculating the hint h determining if $$\|ct_0\|_\infty \geq \gamma_2.$$

6. The method of claim 1, wherein regenerating the value y is based upon $\rho'$ and $\kappa$, where $\kappa$ is a counter value and $\rho'$ is a randomly generated value.

7. The method of claim 1, wherein regenerating the value y is based upon $\rho'$ and $\kappa$, where $\kappa$ is a counter value and $\rho'$ is based on the message M.

8. The method of claim 1, wherein calculating z includes calculating $z=y+cs_1$.

9. The method of claim 1, wherein performing a bound check on z includes determining if $$\|z\|_\infty \geq \gamma_1 - \beta.$$

10. The method of claim 1, further comprising determining if a number of 1's in h is greater than $\omega$, where $\omega$ is a parameter of the Dilithium signing algorithm.

11. The method of claim 1, wherein $\tilde{r}$, z, and y are masked using a plurality of shares.

12. A data processing system comprising instructions embodied in a non-transitory computer readable medium, the instructions for a method of performing a Dilithium signature operation on a message M using a secret key sk, the instructions, when executed, cause a processor of a computing system to perform a method comprising:

calculating a value $\tilde{r}$ based upon $w_0$, c, and $s_2$, where $w_0$ and c are calculated as part of the Dilithium signature operation and $s_2$ is part of the secret key sk, wherein $w_0$ represents an intermediate value and c represents a challenge variable;

performing a bound check on $\tilde{r}$ based upon $\gamma_2$ and $\beta$, where $\gamma_2$ represents a low-order rounding range of a value y and $\beta$ represents a product of a number of ones in the challenge variable c and a private key range $\eta$, where $\gamma_2$ and $\beta$ are parameters of the Dilithium signature operation;

calculating a hint h based on the value f and deleting the value $\tilde{r}$ in a memory;

regenerating the value y using an ExpandMask function, the value y represents a secret masking vector;

calculating z based upon the value y, the challenge variable c, and $s_1$, where $s_1$ is part of the secret key sk and z is a vector;

replacing the value y with z in the memory;

performing a bound check on z based on $\gamma_1$ and $\beta$, where $\gamma_1$ is a coefficient range of the value y of the Dilithium signature operation; and returning a digital signature of the message M where the digital signature includes z and h.

13. The data processing system of claim 12, wherein calculating the value f includes calculating:

$$\tilde{r} = w_0 - cs_2.$$

14. The data processing system of claim 12, wherein performing a bound check on $\tilde{r}$ includes determining if $$\|\tilde{r}\|_\infty \geq \gamma_2 - \beta.$$

15. The data processing system of claim 12, wherein calculating the hint h is further based on c, $t_0$, $w_1$, and $\gamma_2$, where $t_0$ is part of the secret key sk, where $w_1$ is calculated as part of the Dilithium signature operation, and where $\gamma_2$ is a parameter of the Dilithium signature operation.

16. The data processing system of claim 15, further comprising after calculating the hint h determining if $$\|ct_0\|_\infty \geq \gamma_2.$$

17. The data processing system of claim 12, wherein regenerating the value y is based upon $\rho'$ and $\kappa$, where $\kappa$ is a counter value and $\rho'$ is a randomly generated value.

18. The data processing system of claim 12, wherein regenerating the value y is based upon $\rho'$ and $\kappa$, where $\kappa$ is a counter value and $\rho'$ is based on the message M.

19. The data processing system of claim 12, wherein calculating z includes calculating $z=y+cs_1$.

20. The data processing system of claim 12, wherein performing a bound check on z includes determining if $$\|z\|_\infty \geq \gamma_1 - \beta.$$

21. The data processing system of claim 12, further comprising determining if a number of 1's in h is greater than $\omega$, where $\omega$ is is a parameter of the Dilithium signing operation.

22. The data processing system of claim 12, wherein $\tilde{r}$, z, and y are masked using a plurality of shares.

* * * * *